(12) United States Patent
Fournier

(10) Patent No.: US 6,262,999 B1
(45) Date of Patent: Jul. 17, 2001

(54) GENERATION OF PRIMARY RATE CLOCKS FROM CORRECTION VALUES DERIVED FROM THE RECEIVED SYNCHRONOUS RESIDUAL TIME STAMP

(75) Inventor: Rob J. Fournier, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/057,622

(22) Filed: Apr. 9, 1998

(30) Foreign Application Priority Data

Apr. 10, 1997 (CA) .................................................. 2202307

(51) Int. Cl.[7] ......................................................... H04J 3/06
(52) U.S. Cl. .............................. 370/516; 375/355; 375/371
(58) Field of Search ..................................... 370/498, 503, 370/516, 517, 518, 519; 375/362, 371, 372, 373, 374, 355

(56) References Cited

U.S. PATENT DOCUMENTS

| 4,961,188 | * | 10/1990 | Lau ........................................ 370/517 |
| 5,260,978 | * | 11/1993 | Fleischer et al. ...................... 375/354 |
| 5,608,731 | * | 3/1997 | Upp et al. .............................. 370/516 |
| 5,742,649 | * | 4/1998 | Muntz et al. .......................... 375/371 |
| 5,812,618 | * | 9/1998 | Muntz et al. .......................... 375/372 |
| 5,822,383 | * | 10/1998 | Muntz et al. .......................... 375/362 |
| 5,838,749 | * | 11/1998 | Casper et al. ......................... 375/376 |

* cited by examiner

Primary Examiner—Douglas Olms
Assistant Examiner—Bob A. Phunkulh
(74) Attorney, Agent, or Firm—Marks & Clerk

(57) ABSTRACT

A method of generating a clock from a signed correction value derived from cells carrying timing information in an asynchronous network involves deriving a decrement/increment indicator from the sign of the received correction value. A local clock is incremented and decremented in a predetermined period accordance with said decrement/increment indicator and the true magnitude of the received correction value.

12 Claims, 2 Drawing Sheets

GENERATION OF PRIMARY RATE CLOCKS FROM CORRECTION VALUES DERIVED FROM THE RECEIVED SYNCHRONOUS RESIDUAL TIME STAMP

FIELD OF THE INVENTION

This invention relates generally to the field of asynchronous data networks, for example, ATM (asynchronous transfer mode networks), and in particular a method of clock recovery over asynchronous networks.

BACKGROUND OF THE INVENTION

ATM networks are essentially asynchronous in nature. In some applications, some means of recovering timing information as the data is transported through the network must be provided. For example, when a TDM link, such as a primary rate link, is connected to the output of an ATM switch, the timing information must be recovered to generate the primary rate clock of the source link.

One known method of recovering timing information across ATM networks is the Synchronous Residual Time Stamp (SRTS). This process, which assumes the network is timed to a master clock, is defined in ITU Recommendation I.363. The ATM network clock is taken and divided by 2[k], where k=0.1 ... 11. k is chosen to produce a frequency near the service bit-rate of the source link (greater than but less than twice the rate). The difference between the service bit-rate and the network related frequency is produced and the 4 LSBs of this difference are transmitted using 4 CSI bits from 8 successive ATM cells. These 4 bits comprise the SRTS. Both transmitter and receiver carry out this process and by comparing the locally produced SRTS with the received far-end SRTS, the local clock can be synchronized to the remote clock. Section 6 of the Bellcore document, GR-1113-CORE describes in detail a method of implementing STRS clock recovery.

In a known method of primary rate clock recovery (See Integrated Telecom Technology, Inc. AAL1 SAR Processor WAC-021__B, User's Manual, Data Sheet, 1996) the 1.544 MHz nominal primary rate clock is recovered using the Synchronous Residual Time Stamp (SRTS) method. The SRTS value transported over the ATM fabric is extracted by the SAR device at the receiver. This device compares the received SRTS value with a locally generated SRTS value derived from the receiver clock and outputs a signed 4-bit correction value having a value between −8 and +7.

The correction value is used to control the number of pulses of a 1.55520 MHz clock to be multiplexed with a fixed number of 1.495384 MHz clock pulses. The suggested ratio is 158+n 1.5552 MHz pulses to 35 1.495384 MHz pulses in a period of 193+n pulses, where n=the SRTS correction value. Thus, if the correction value is zero (signifying a nominal 1.544 MHz clock), the output clock will have a frequency deviation (fd) from nominal of +11, 200/−48,616 Hz. The frequency of modulation from nominal fm) depends on the implementation with a non-sinusoidal 8 kHz fm at the low end, which will vary slightly depending on the magnitude and sign of the correction value. This represents intrinsic jitter, which can be defined in peak-peak Unit Intervals (UI) as Jp-p=fd/$\pi$*fm, where fm is a sinusoidal modulating frequency and fd is the frequency of deviation of the carrier frequency.

The use of a correction value implies that the output clock is averaged over time to arrive at the final locked frequency. This function creates low frequency jitter. Any averaging jitter below 6 Hz (more properly referred to as wander) will pass through the jitter attenuator unattenuated. The SRTS method itself also has the characteristic of waiting time jitter, which, by nature, is 1 UI. The above prior art arrangement is relatively complicated to implement.

The prior art method of clock recovery requires complex logic circuitry to implement.

An object of the invention is to provide a clock recovery method that can be implemented with simple logic circuitry.

SUMMARY OF THE INVENTION

According to the present invention there is provided a method of generating a corrected clock signal from a signed correction value derived from cell s carrying timing information in an asynchronous network, comprising the steps of deriving a decrement/increment indicator from the sign of the received correction value, deriving the true magnitude from the received correction value, and incrementing or decrementing an output signal in a predetermined period accordance with said decrement/increment indicator and said true magnitude.

In a preferred embodiment, the increment/decrement unit indicator enables a divide-by-16 counter in such a manner as to increase the period of an LSB (Lowest Significant Bit) by 25% when the final frequency is to decrease, or to decrease the period of an LSB by 25% for an increase in output frequency. The MSB (Most Significant Bit) of the divide-by-16 counter provides a nominal DS1 clock output for a primary rate T1 link. This output can be passed through an external jitter attenuator 8 before being presented as a clock.

The invention will now be described in more detail, by way of example, only with reference to the accompanying drawings, in which:

DESCRIPTION OF THE PREFERRED EMBODIMENTS

Figure 1:
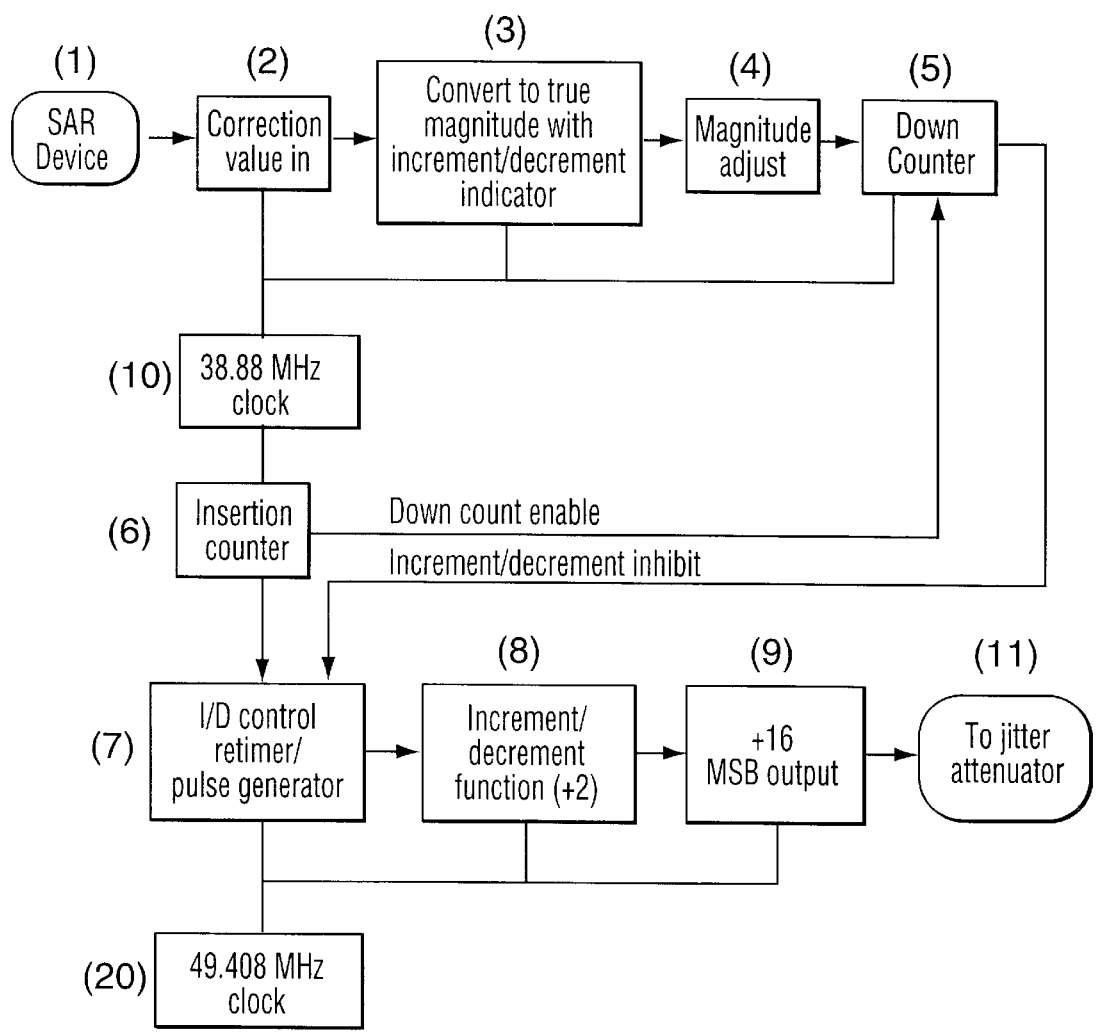
FIG. 1 is a block diagram of a frequency generator for recovering timing information from an ATM network.

Referring now to FIG. 1, a SAR (Segmentation and Reassembly Device) 1 receives cells from an ATM network and extracts the SRTS in a manner known per se. The device 1 compares the received SRTS value with a locally generated SRTS from a 38.8 MHz clock 10 to derive a correction value 2 lying between −8 and +7, that is a signed 4-bit number representing the difference between the locally generated SRTS derived from clock 10 and the SRTS received over the network and derived in unit 1. This is accompanied by port information identifying the port of the incoming cells.

Circuit 3 converts the correction value obtained from the SAR device 1 from its signed binary representation into its three bit magnitude form with a corresponding increment/decrement indicator derived from the sign of the received correction value output from unit 2. The magnitude is then adjusted to four bits in magnitude adjustment unit 4. This adjusts the bandwidth of the frequency generator by manipulating the amount of the adjustments to be made.

This adjustment magnitude is loaded into down counter 5, which inhibits the increment/decrement unit 7 when the counter reaches zero and prevents the decrement unit from making any more adjustments.

An output from the 38.88 MHz clock 10 is fed to insertion counter 6, which spaces the adjustments out over the correction period. The clock 10 generates an enable pulse for the down counter and a pulse to indicate to the Increment/Decrement pulse generator when an adjustment can be made. The chosen spacing allows 32 adjustments to fit into an SRTS correction period (~1.98 msecs.).

Unit 7 retimes a control pulse from the counter 6 to the 49.408 MHz local clock 20 and generates a control pulse synchronous to the 49.408 MHz clock that is used by the increment/decrement control unit 7 and the increment/decrement function unit 8. The control pulse is aligned in such a manner as to extend the period of the increment/decrement function 8 by half a cycle during an adjustment.

The increment/decrement function unit 8 creates an enable pulse for the divide-by-16 functional block 9 based on the sign bit of the correction value and the pulse generated by the unit 7. This unit can also be considered as diving by 2 the output of the 49.408 MHz clock 20, which has its phase modified by the control pulse from block 7 during an adjustment. The control pulse enables the toggling of the LSB of the divide-by-16 counter in the manner shown in the waveforms in FIG. 2.

Figure 2:
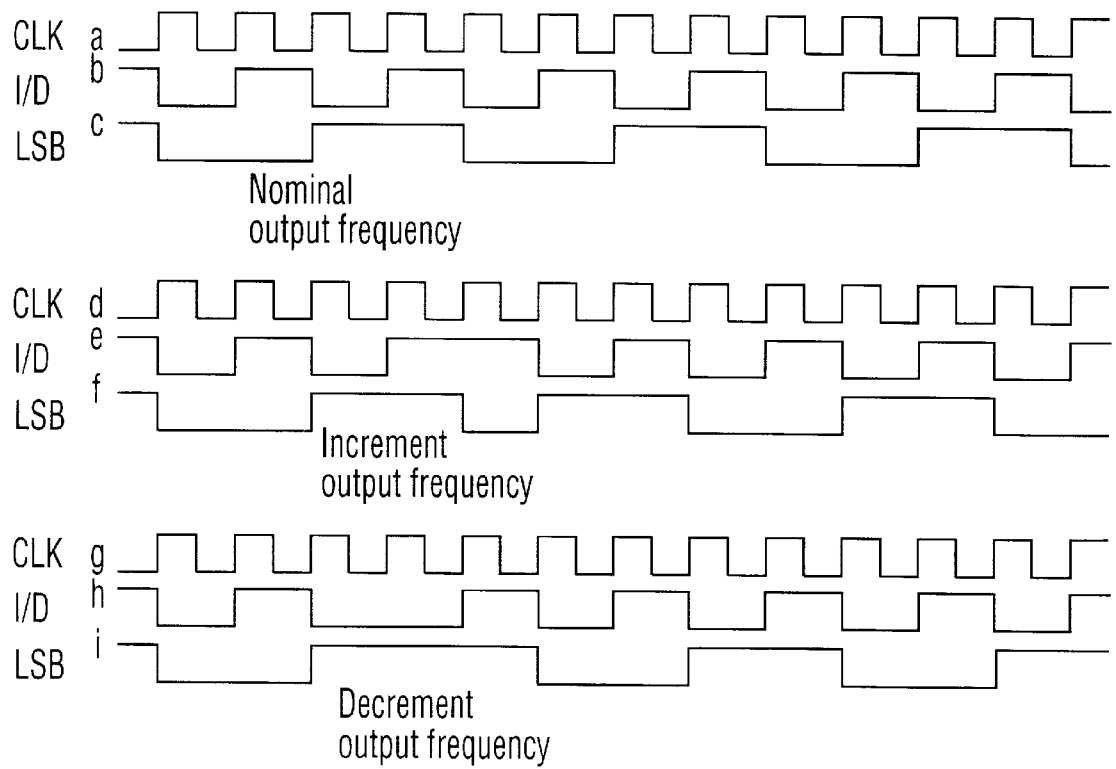
FIG. 2 is a timing diagram showing normal, increment and decrement functions.

The unit 8 enables the toggling of the Lowest Significant Bit of the Divide-by-16 counter 9 as apparent from the waveforms shown in FIG. 2. Unit 9 is a divide by 16 counter. Its Most Significant Bit (MSB) is the recovered clock, i.e. 24.704/16=1.544 MHz.

In FIG. 2, waveforms a to c show the situation at nominal output frequency, d to f, shows the situation when the output frequency is incremented, and g to i show the situation when the output frequency is decremented.

Waveforms a, d, g show the output (CLK) of the 49.408 MHz clock 20. When the output frequency is at nominal value, the output b of the increment/decrement counter is square wave b and the LSB of the divide-by-16 counter 9 has a rectangular form as shownat c.

If the output frequency is too low, the phase of the increment/decrement counter jumps in phase as shown at e and toggles the LSB of the devide-by-16 counter 9 to shift the waveform to the left. The reverse situation occurs if the output frequency is too high, as shown in waveforms h, i.

Unit 11 is an external jitter attenuator that smoothes out the phase jumps of the adjustments.

The above design is simple to implement and yet keeps the amount of jitter and wander within acceptable limits.

Appendix A is a program listing of a practical implementation of the invention using a microprocessor.

I claim:

1. A method of generating a corrected clock signal from a signed correction value derived from cells carrying timing information in an asynchronous network, comprising the steps of:

providing first and second local clocks;

deriving said signed correction value by comparing a timestamp received over the network with generated by said second local clock;

deriving a decrement/increment indicator from the sign of the received correction value;

deriving the true magnitude from the received correction value; and incrementing or decrementing the output of said first local clock in accordance with said decrement/increment indicator and said true magnitude;

wherein an insertion counter clocked by said second local clock triggers frequency adjustments until an inhibit signal is received from a second counter whose output is dependent on said true magnitude.

2. A method as claimed in claim 1, wherein said time stamps are synchronous residual time stamps (SRTS).

3. A method as claimed in claim 2, wherein said frequency adjustments are distributed over an SRTS correction period.

4. A method as claimed in claim 1, wherein the true magnitude is a 3-bit number derived from a 4-bit number representing the signed correction value, and said 3-bit number is converted to a 4-bit number representing an adjustment magnitude that is loaded into said second counter.

5. A method as claimed in claim 4, wherein said second counter is a down counter.

6. A method as claimed in claim 1, wherein an increment/decrement controller receiving pulses from said insertion counter and said second counter enables the toggling of the lowest significant bit of a divide-by-n counter receiving clock signals derived from said first local clock.

7. A method as claimed in claim 6, wherein the divide-by-n counter receives signals from said first local clock that have been adjusted in phase by control pulses from said increment/decrement controller.

8. A method as claimed in claim 7, wherein most significant bit of the divide-by-n counter provides the corrected clock signal.

9. A method as claimed in claim 1, wherein the corrected clock signal is passed through an external jitter attenuator.

10. An apparatus for generating a clock from a signed correction value derived from cells carrying timing information in an asynchronous network, comprising:

a first local clock;

a second local clock for generating a local timestamp;

a SAR (segmentation and reassembly) device for extracting a timestamp from the network;

means for deriving a correction value by comparing said local timestamp with said timestamp received from the network;

means for deriving a decrement/increment indicator from the sign of the received correction value and for deriving the true magnitude from the received correction value:

an increment/decrement controller for incrementing or decrementing said local clock in accordance with said decrement/increment indicator and said true magnitude;

an insertion counter receiving clock signals from said second local clock and generating enable pulses for an increment/decrement controller; and a second counter for generating inhibit pulses to said increment/decrement controller dependent on said true magnitude.

11. An apparatus as claimed in claim 10, further comprising a divide-by-n counter receiving clock signals from said first local clock, and wherein said increment/decrement controller generates control pulses for enabling said divide-by-n counter providing the corrected clock signal.

12. An apparatus as claimed in claim 11, wherein said control pulses from said increment/decrement controller are fed to a divider that generates enable pulses for said divide-by-n counter.

* * * * *